UNITED STATES PATENT OFFICE.

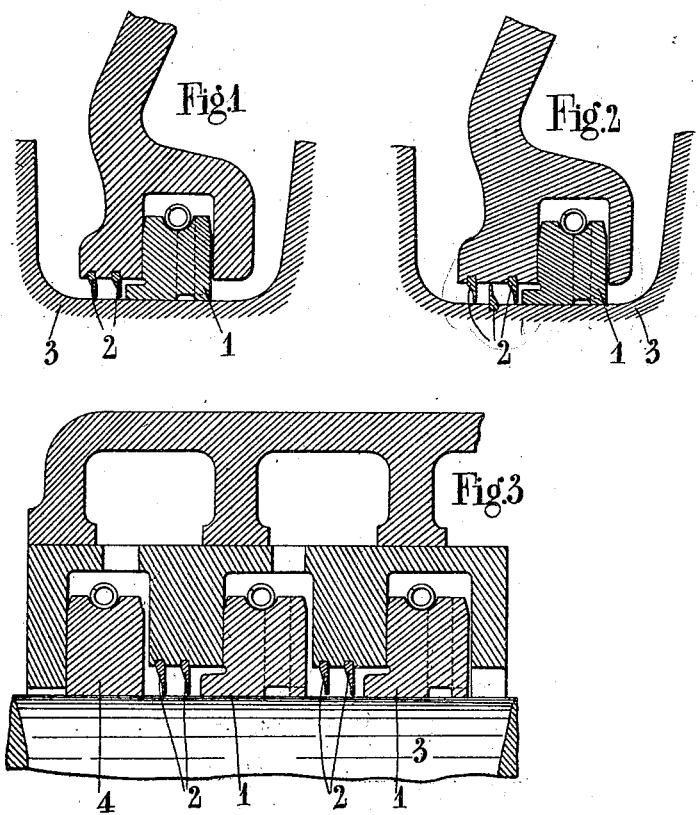

CHARLES ALGERNON PARSONS, STANLEY SMITH COOK, AND LOUIS MORTIMER DOUGLAS, OF WALLSEND, ENGLAND; SAID COOK AND DOUGLAS ASSIGNORS TO SAID PARSONS.

PACKING-GLAND FOR ROTATING BODIES.

1,374,520.  Specification of Letters Patent.  Patented Apr. 12, 1921.

Application filed March 30, 1920. Serial No. 370,035.

*To all whom it may concern:*

Be it known that we, CHARLES ALGERNON PARSONS, K. C. B., STANLEY SMITH COOK, and LOUIS MORTIMER DOUGLAS, all subjects of the King of Great Britain and Ireland, and all residing at Turbinia Works, Wallsend-on-Tyne, in the county of Northumberland, England, have invented certain new and useful Improvements in Packing-Glands for Rotating Bodies, of which the following is a specification.

This invention relates to packing glands for rotating bodies and is more particularly concerned with those for the rotors of steam turbines.

In a steam turbine glands are necessary where the shaft passes through the casing and at the openings in diaphragms which separate the sections of the turbine in which different steam pressures exist.

For these purposes glands have been proposed in which the packing consists of one or more projections either on the stationary or on the rotating members or on both, such projections having but a very small clearance from the opposite member. It has also been suggested to form the projections on a portion of the stationary member capable of a limited radial movement.

In another construction of gland, rings made up of sections of carbon or the like material are pressed actually or nearly into contact with the shaft. Glands of this type form the subject matter of British specifications Nos. 121,622 and 121,718 and 134,067 which describe glands in which the ring sectors are balanced—that is they are in radial equilibrium under the steam pressure. Such balanced packing reduces the steam leakage to a very small amount and as this packing is practically frictionless it therefore seldom, if ever, requires adjustment owing to wear, but as there is a possibility of the carbon sections breaking, the use of such packing has been limited, especially in glands which are not readily accessible.

The object of this invention is to obviate this difficulty while obtaining the advantages of the balanced type of packing ring of carbon or the like material.

The invention consists in providing in a packing gland projections either on the stationary or the rotating member, or on both, said projections having a small clearance from the opposite member, in combination with a stationary balanced divided ring or rings of carbon or the like material in contact with the rotating member.

The invention also consists in the improved packing glands hereinafter described.

Figure 1 is a sectional view on a plane passing through the shaft axis of the preferred form of our device.

Fig. 2 is a similar view of a modification of that form illustrated in Fig. 1.

Fig. 3 is a similar view of a modification applicable to a turbine.

In carrying our invention into effect according to the form shown in Fig. 1, we provide within the housing of the gland a stationary balanced divided ring 1 of carbon or the like of the type described in British specification No. 121,718, and fixed to the housing either on the high or low pressure side of the ring are a number of internal projections 2 extending toward the rotating member 3 and having a small clearance therefrom.

Instead of the projections 2 being fixed to the stationary member they may be carried by the rotating member, or, as shown in Fig. 2, they may be fixed alternately on the rotating and stationary members giving what is known as a labyrinth packing. These projections are preferably formed with sharpened edges to minimize the effects of any accidental contact.

Figure 4:
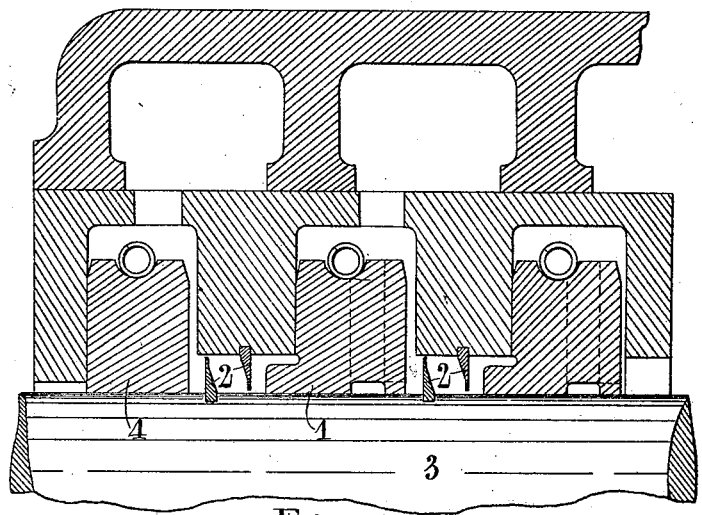
Fig. 4 is a similar view of a modification of that form shown in Fig. 3.

Obviously the combination described is as easily applicable to external glands, that is, those surrounding the shaft where it emerges from the casing, as to those required in the various diaphragms existing in the turbine. Two forms of such a gland are illustrated in Figs. 3 and 4. In these cases one or more balanced rings 1 are employed and a corresponding number of sets of projections 2.

In the example shown in Fig. 3 these latter are all fixed to the stationary member whereas in that depicted in Fig. 4 half of the projections are carried by the stationary member, the remainder being fixed on the rotating member. In each of these two examples an unbalanced ring 4 is shown on the low pressure side of the gland. This, however, is not essential to nor does it form part of the invention.

Figure 5:
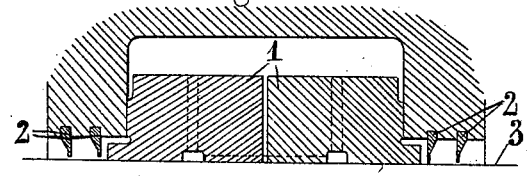
Fig. 5 is a similar view of a modification of a device in which each side is a high pressure side.

In Fig. 5 we have illustrated a gland constructed in accordance with this invention suitable for the case in which the higher pressure may exist on either side. Two balanced rings are employed having the projections formed on them pointing in opposite directions. A set of projections 2 is, as indicated, provided on each side of the balanced rings.

It will be obvious that many different combinations of projections having a clearance with balanced segmental rings having actual contact with the rotating member might be devised, and the invention is not to be regarded as limited to those above described.

The advantage of the combination lies in the fact that while under normal conditions the leakage of steam or other fluid under pressure is resisted by the contacting segmental rings, if, from any cause, these cease to act as efficient packing members, the projections having a small clearance from the opposite member will prevent serious leakage, so that the machine can be run at least until such time as it is convenient to dismantle it for replacing the ring in contact with the rotating member.

The projections having a small clearance from the opposite member may be placed on the high pressure side of the low pressure side or on both sides of the contacting segmental ring or rings.

Having now described our invention what we claim as new and desire to secure by Letters Patent is:—

1. In a packing gland for rotating bodies, the combination of projections either on the stationary or the rotating member, said projections having a small clearance from the opposite member, with a stationary balanced divided ring or rings of carbon or like material in contact with the rotating member.

2. In a packing gland as set forth in claim 1, fixing the projections alternately on the stationary and rotating members so as to form a labyrinth packing.

In testimany whereof we have signed our names to this specification.

CHARLES ALGERNON PARSONS.
STANLEY SMITH COOK,
LOUIS MORTIMER DOUGLAS.